Nov. 7, 1961 G. S. ELLITHORPE 3,008,121
FLASHER LIGHT WARNING DEVICE
Filed Nov. 13, 1957 2 Sheets-Sheet 2

INVENTOR.
Gilbert S. Ellithorpe
BY
Walter S. Paul.
ATTY.

# 3,008,121
FLASHER LIGHT WARNING DEVICE
Gilbert S. Ellithorpe, P.O. Box 138, Waterman, Ill.; Evelyn Pratt Ellithorpe, executrix of said Gilbert S. Ellithorpe, deceased
Filed Nov. 13, 1957, Ser. No. 696,119
7 Claims. (Cl. 340—62)

This invention relates to improved control circuits for the normal turn signal lights on a motor vehicle to adapt them for use as safety reduced speed and deceleration warning signals.

One of the objects of this invention is to adapt the normal turn signal control circuit to automatically flash the two rear signal lights (normally used for stop or turn signals) in response to a reduction of speed below a predetermined minimum without interfering with the normal operation of the turn signal control for flashing the turn signal lights on the side to which the turn signal control switch is moved.

Another object is to provide a manually operated switch for disabling the operation of the above automatic flash.

A further object is to add a control in parallel with the above speed responsive control for automatically flashing the two rear turn signal lights whenever the brakes are used to decelerate the motor vehicle when either rear signal light is not in operation to indicate a turn.

Another object is to provide continuous burning of the two rear lights in response to the minimum speed or the brake operation, without interfering with the normal flashing of the proper lights in response to the turn signal control.

Another object is to provide only the brake switch control in the above circuits for flashing the two rear lights without the use of the speed control warning lights whenever the turn signal lights are not in operation.

A further object is to provide a turn signal control switch adapted for use in the above circuits.

A further object is to provide a double circuit brake switch for control of the flasher warning lights lights on the rear of the vehicle.

Figure 1:
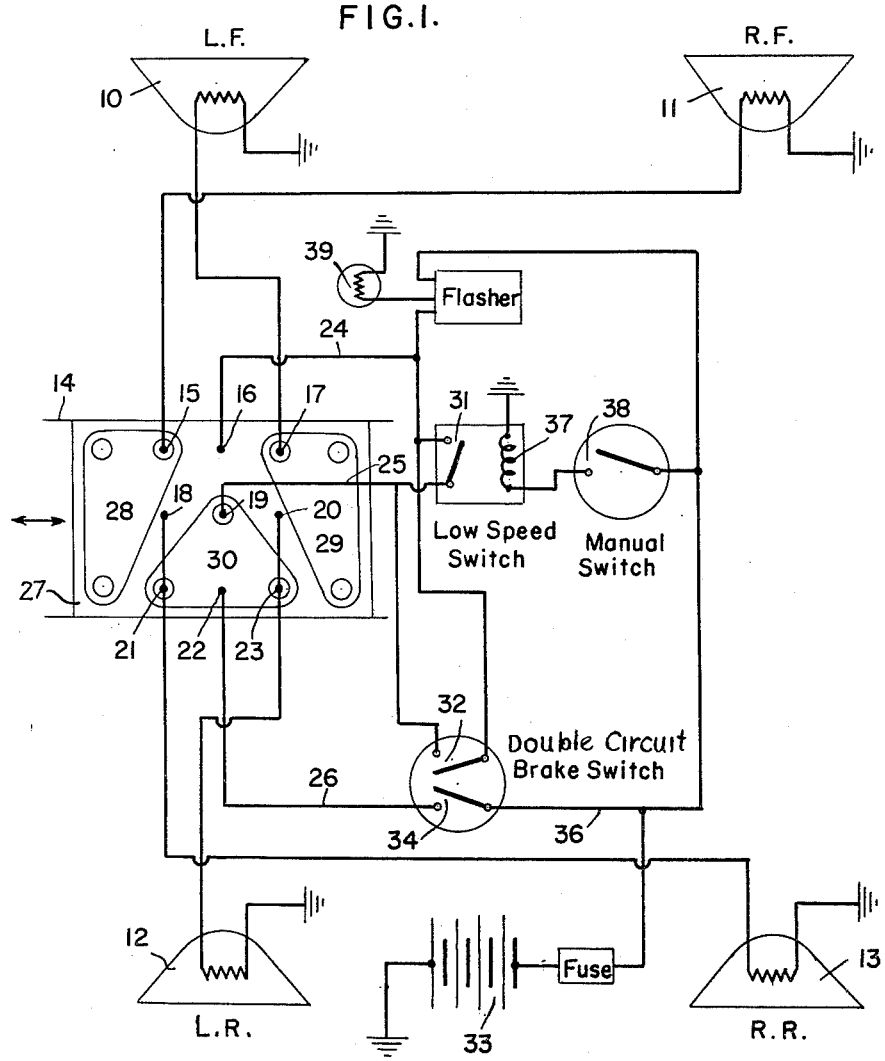

Other and more specific objects will appear in the following detailed description of the invention, having reference to the accompanying drawings, wherein:

FIG. 1 is a schematic wiring diagram of the novel combination of circuits for adapting a normal turn signal control system for providing the brakes and reduced speed and deceleration flashing warning lights.

Figure 2:
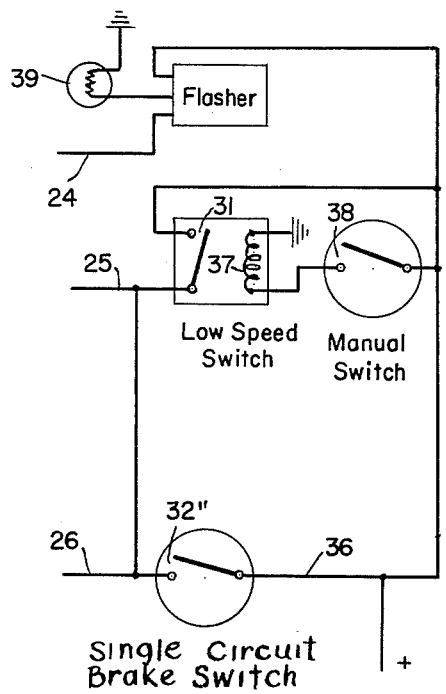
Figure 3:
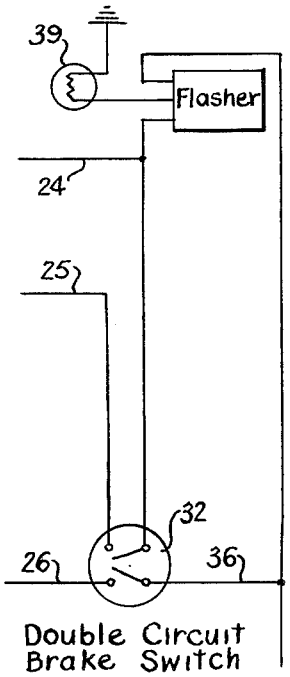
Figure 4:
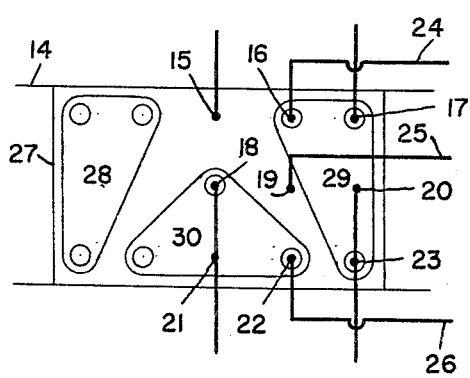
Figure 5:
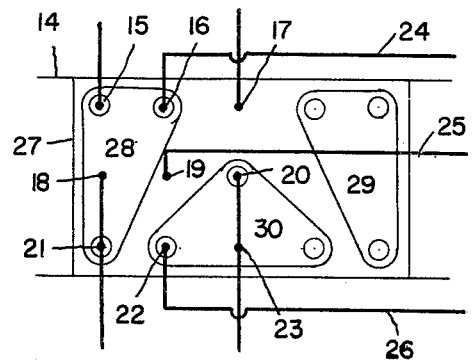

FIG. 2 is a portion of a modified control system for providing the slow speed or stop warning signals, without the flasher warning lights, FIG. 3 is a further modified control system for connecting the flasher warning lights in connection with the brake switch without the slow speed warning lights, FIGS. 4 and 5 are schematic diagrams of the turn signal control switch in the left and right turn positions respectively.

A preferred arrangement of circuits and contacts in the turn signal switch in accordance with the present invention is shown in FIG. 1, the signal lights being shown in plan in their relative positions as they would occupy in a vehicle, the front of which would be at the top of the figure.

The L.F. and R.F. lamps 10 and 11 represent the left front and right front lights respectively, which are normally used as turn signal lights. The L.R. and R.R. lamps 12 and 13 represent the left rear and right rear lights respectively, which are similarly used at the rear of the vehicle.

The turn signal switch 14 is diagrammatically represented as having three vertically spaced horizontal rows of three equally spaced stationary contacts each, comprising the nine contacts 15, 16, 17, 18, 19, 20, 21, 22 and 23 respectively. The upper corner contacts 15 and 17 are terminals for the leads to the right and left signal lamps, 11 and 10, respectively. The remaining two contacts 18 and 21 on the left side are interconnected to a single terminal for the lead to the right rear lamp 13, and the remaining two contacts 20 and 23 on the right side are interconnected terminals for the lead to the left rear lamp 12. The three contacts down the middle 16, 19 and 22 are terminals for the input leads 24, 25 and 26, respectively.

The movable panel 27 of the switch is slidable to the left and right from the position shown in FIG. 1 to the positions shown in FIGS. 4 and 5, respectively, for normal operation of the turn signals. The panel 27 is made of insulated material and has three generally triangular conductor plates 28, 29 and 30 set into corresponding depressions in the under surface of panel 27. Springs in these depressions bias the plates so that their three projecting contacts at the corners bear against the surface of the stationary panel as the movable panel is slid thereover.

Thus, in the normally "off" position as shown in FIG. 1, the input lead 25 is connected to the rear signal lamps through the conductor plate 30. Lead 25 is supplied with impulses from the normal flasher circuit through either one of two parallel switches; 31 which is responsive to a reduction in speed of driving to a predetermined minimum, or 32 which is a part of the brake switch, for flashing the rear lights as a safety precautionary measure for alerting drivers approaching from the rear.

Upon normal operation of the switch to the left or right to indicate a contemplated left or right turn, the normal flasher circuit is directed through contact 16 and the right or left conductor plate 29 or 28 to the corresponding front and rear signal lamps as usual, but now the rear lamp on the opposite side is connected to the battery 33 through the lead 26 and conductor plate 30, whenever the brakes are applied, closing switch 34 to apprise any drivers in the rear when the vehicle starts to slow down for the turn or for any other purpose before the turn when the turn signals are operating.

The modification in the above circuits as shown in FIG. 3 may be made by eliminating the branch of the flasher circuit in which the low speed switch 31 is used, in order to obtain flashing lights on the rear lamps when the brakes are applied and turn signals are not in operation.

In the modification shown in FIG. 2, a single brake switch 32' is connected in parallel with a low speed switch 31 between the battery and both input leads 25 and 26 so as to cause steady burning of the rear lamps whenever the speed is below a certain minimum or the brakes are applied, with the turn signal switch affecting only the light on the turn signal side, by changing it to the flashing signal normally obtained from the flasher circuit input lead 24.

It will be noted that the operation of the front lights as turn signals is unaffected by any of the above described circuits, but the rear lights, while not affected in their normal use as turn signals, are made use of additionally as safety signals to alert any drivers approaching from the rear and put them on notice that your vehicle is being decelerated or is already moving at an unusually low speed or is being stopped.

The pilot light 39 may be positioned in a convenient place to indicate when the flasher circuit is in operation.

The low speed switch 31 may be operated by a speed governor type of electrical solenoid control for normally keeping the switch open whenever the speed is above a certain minimum. This control 37 may be disconnected by means of a manual switch 38.

Many obvious modifications in the arrangement of parts and circuits may be made without departing from the spirit and scope of the present invention, as defined in the appended claims.

Reference is here made to my copending application S.N. 414,975, filed March 9, 1954, now Patent No. 2,859,382, on other circuits for making use of the lights normally used for turn signals, for some other safety purpose besides turning signals.

What is claimed is:

1. An automobile safety signal system comprising left and right front signal lights, left and right rear signal lights, a turn signal switch for said lights having three vertically spaced horizontal rows of three horizontally spaced stationary contacts in each row, a lead from each front light terminating at a contact in the corresponding end of the upper horizontal row, a lead from each rear light terminating at a contact in the corresponding end of the lower horizontal row, the end contacts in the middle horizontal row having common terminals with corresponding end contacts in the lower horizontal row, a movable insulator panel having three spaced conductor plates slidable over said stationary contacts to straddle selected contacts and complete left and right turn signal circuits when the panel is moved to opposite sides from a neutral mid position, a battery, a single flasher unit supplying intermittent current from the battery through an input lead terminating in the middle contact in the upper row for flashing right and left turn signals through corresponding end conductor plates when moved to straddle said middle contact and the corresponding end contacts, and at least one branch control circuit between the battery and each of the middle contacts in the other two rows for supplying rear light signals through the middle conductor plate in any panel position.

2. A safety signal system as defined in claim 1 wherein the branch circuit to the mid contact in the lower row includes a brake switch for operating both rear lights when the panel is in neutral and only the opposite rear light when a turn signal operates one rear light.

3. A safety signal system as defined in claim 2, a shunt connection between said mid contact in the lower row and the mid contact in the middle row, and a low speed switch shunted across said brake switch for supplying a constant signal to the rear lights in response to either a predetermined low speed or brake operation.

4. A safety signal system as defined in claim 3, and a manual cut-off switch between the battery and said low speed switch for rendering the low speed switch inoperative when desired.

5. A safety signal system as defined in claim 4, wherein the branch circuit to the mid contact in the middle row includes said flasher unit and a second brake switch in series for providing a flash signal on both rear lights in neutral turn position when decelerating and a constant signal on the opposite rear light when signaling a turn to the other side.

6. A safety signal system as defined in claim 5, and a low speed switch shunted across said second brake switch for mutual control of said flasher circuit to said mid contact in the middle row.

7. A safety signal system as defined in claim 6, and a cut-off switch between the battery and said low speed switch for rendering the low speed switch ineffective when desired.

References Cited in the file of this patent

UNITED STATES PATENTS

| | | |
|---|---|---|
| 1,785,397 | Schoenberg et al. | Dec. 16, 1930 |
| 2,321,803 | Falge et al. | June 15, 1943 |
| 2,667,627 | Hollins | Jan. 26, 1954 |
| 2,757,363 | Casisky | July 31, 1956 |
| 2,810,899 | Foster | Oct. 22, 1957 |